United States Patent [19]
Nakano

[11] Patent Number: 5,254,988
[45] Date of Patent: Oct. 19, 1993

[54] DATA COMMUNICATION SYSTEM WITH CARD MOUNTING PORTION

[75] Inventor: Yuji Nakano, Kawasaki, Japan

[73] Assignee: Canon Kabushiki Kaisha, Tokyo, Japan

[21] Appl. No.: 644,381

[22] Filed: Jan. 22, 1991

[30] Foreign Application Priority Data

| Jan. 26, 1990 | [JP] | Japan | 2-16560 |
| Jan. 29, 1990 | [JP] | Japan | 2-19882 |
| Jan. 30, 1990 | [JP] | Japan | 2-19732 |

[51] Int. Cl.$^5$ .................... G06K 13/063; H03M 11/00
[52] U.S. Cl. ................................. 341/22; 235/485; 235/454
[58] Field of Search ............ 341/22; 358/444, 442, 358/468; 340/825.34; 379/100, 102; 235/380, 381, 382, 376, 483, 484, 485, 479, 454

[56] References Cited

U.S. PATENT DOCUMENTS

| 4,625,276 | 11/1986 | Benton et al. | 235/380 |
| 4,782,217 | 11/1988 | Soza | 340/825.34 |
| 4,795,891 | 1/1989 | Morigaki | 235/380 |
| 4,825,059 | 4/1989 | Kurihara et al. | 235/483 |
| 4,901,068 | 2/1990 | Benton et al. | 340/825.34 |
| 5,004,964 | 4/1991 | Kataoka | 318/128 |
| 5,075,686 | 12/1991 | Shigemura | 341/22 |

OTHER PUBLICATIONS

U.S. Application Ser. No. 07/644,443, Jan. 22, 1991 Claims 1–10 & FIGS. 1–24 and Abstract.
U.S. Application Ser. No. 07/634,471, Dec. 27, 1990 Claims 1–9, FIGS. 1–41 and Abstract.

Primary Examiner—John K. Peng
Assistant Examiner—Robert Gray
Attorney, Agent, or Firm—Fitzpatrick, Cella, Harper & Scinto

[57] ABSTRACT

A data input/output system comprises a mounting portion on which a data memory card having data input keys is mounted freely detachably. The mounting portion having an opening through which keys on a mounted card can be operated positions the mounted card using a simple configuration so that the data memory card and the main unit can transfer signals accurately.

7 Claims, 8 Drawing Sheets

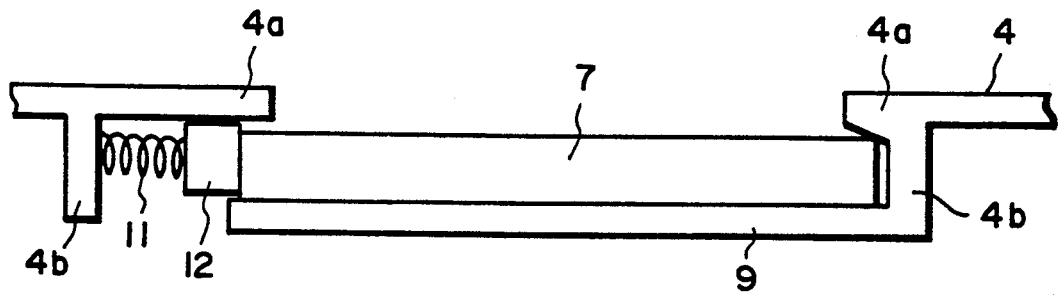
F I G. 12
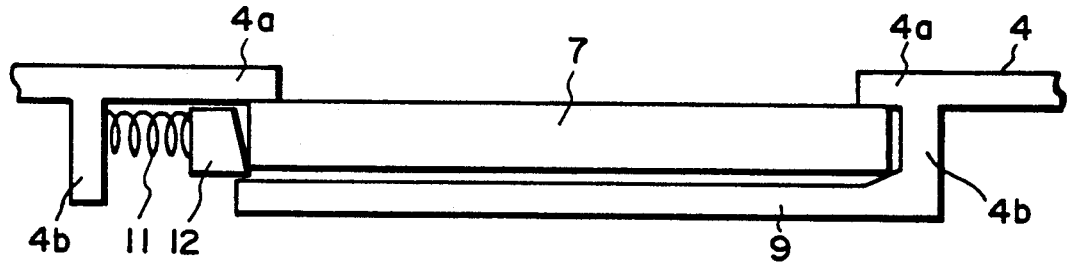
F I G. 13
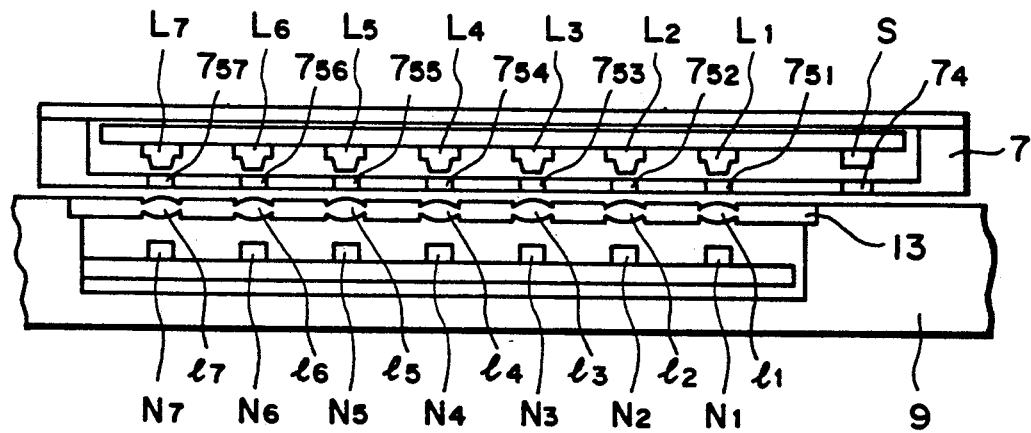
F I G. 14

DATA COMMUNICATION SYSTEM WITH CARD MOUNTING PORTION

BACKGROUND OF THE INVENTION

1. Field of the Invention

The present invention relates to a data input/output system having a mounting portion on which an electronic telephone directory card or other data memory card is mounted freely detachably.

2. Related Background Art

Facsimile systems have incorporated various advanced functions recently, and are getting more and more multifunctional. With the advent of the advanced and multifunctional facsimile system, it becomes possible to register destinations or addresses in abbreviated dial sets. Thereof, the number of operation input switches on an operator panel is tend to increase. The increase in the number of switches causes such a problem that individual switches are made too compact and thereby the operability is deteriorated.

In a system disclosed, for example, in FIG. 1 of U.S. Pat. No. 5,675,686, one operation input switch contains multiple input functions and selects any input function.

In compliance with the multifunctional move, an IC ROM card is installed to further multiply the functions of a facsimile system. The ROM card is used with its end connected to a connector of the facsimile system, thus increasing memory capacity of the main unit of the facsimile system.

However, when one facsimile system is shared among multiple users, the users' facsimile receiving stations differ from person to person. In the aforesaid prior system, the number of registrable abbreviated dial sets is limited. Since a connector is required, the structure of a facsimile system becomes complex. This results in a limited memory capacity. Therefore, all of the multiple users cannot register their intended company names or other addresses in a memory of the main unit of a facsimile system.

To solve these problems, U.S. Pat. No. 5,004,964 has proposed, a facsimile system comprising a mounting portion on which an electronic telephone directory card or other data memory card having data input keys can be attached or mounted freely detachably. Therein, the mounted data memory card can be operated externally. In this proposal, the mounting portion for mounting a card has a recess 31 in the main unit of the facsimile system and has the size of the data memory card as shown in FIG. 15. A card is inserted into the recess 31 from above or sideways, and then shifted laterally with springs to be positioned properly.

A card thus mounted works to communicate data with the main unit of the facsimile system. Information specified by operating keys on the card is sent as optical information from light emitting elements on the back of the card into light receiving elements in the main unit of the facsimile system.

However, in the foregoing facsimile system, a card is placed on the bottom of the recess 31 in the mounting portion and then positioning is made. Therefore, the card must be arranged so that no gap may be formed between the card and the bottom of the recess 31. If a gap is created between the card and facsimile system, light emitting elements on the back of the card and light receiving elements in the main unit of the facsimile system are positioned incorrectly. Due to insufficient light or incident external light, the light receiving elements may receive incorrect optical information.

The gap between a card and the bottom of the recess 31 of the mounting portion, is formed because the card weighs only several grams. Therefore, when the card is positioned askew, the end of the card is galled to the side wall of the recess 31 of the mounting portion. As a result, the card is not made into close contact to the bottom of the recess of the mounting portion.

When the facsimile system is placed almost horizontally, if the card is put in the recess 31 of the mounting portion correctly, the card will be brought into close contact with the bottom of the recess 31. However, if the facsimile system is inclined, it becomes difficult for the card to be made into close contact with the bottom of the recess 31 when only the weight of the card is used for positioning. To solve this problem, the card may be made heavier. A card acting as an electronic telephone directory is often put in a purse or the like and carried here and there. It should be compact and light-weight. A heavier card may lead to an increase in costs. As described engagement or contact between the card and the bottom of the recess 31 is independent of the card weight, so when the electronic telephone directory card is mounted in the main unit of the facsimile system, it must be positioned precisely. This requires a user's attention. Moreover, the facsimile system must be installed in an even place. This deprives a user of freedom in arranging the facsimile system.

To solve these problems, a facsimile system ensuring an intimate contact between a card and a mounting portion in the main unit has already been proposed in an earlier application filed Dec. 27, 1990. Required is that the card and mounting portion can be positioned properly using a simple configuration.

SUMMARY OF THE INVENTION

The object of the present invention is to solve the aforesaid problems, so that a card acting as an electronic telephone directory can be positioned in a mounting portion in the main unit of a facsimile system merely using a simple configuration.

The other objects of the invention will be apparent in conjunction with the embodiments described below.

BRIEF DESCRIPTION OF THE DRAWINGS

FIG. 12 shows a modification of the second embodiment in FIG. 10.

FIG. 13 is a detailed view of the mounting portion of a system implementing the third embodiment of the invention.

FIG. 14 shows the relation between the light receiving unit of an installation unit and the light emitting unit of a card shown in FIG. 13.

DESCRIPTION OF THE PREFERRED EMBODIMENTS

Figure 1:
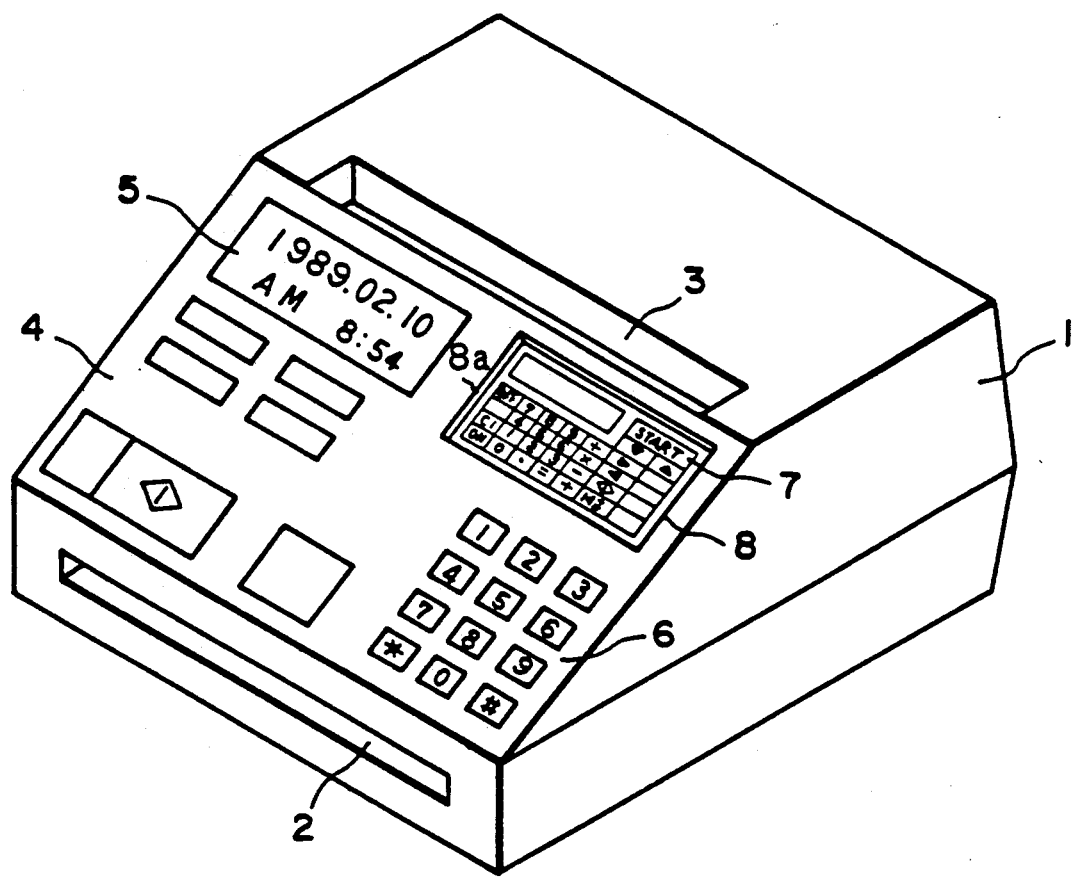
FIG. 1 is a perspective view of an entire system implementing the first embodiment of the invention.
Figure 2:
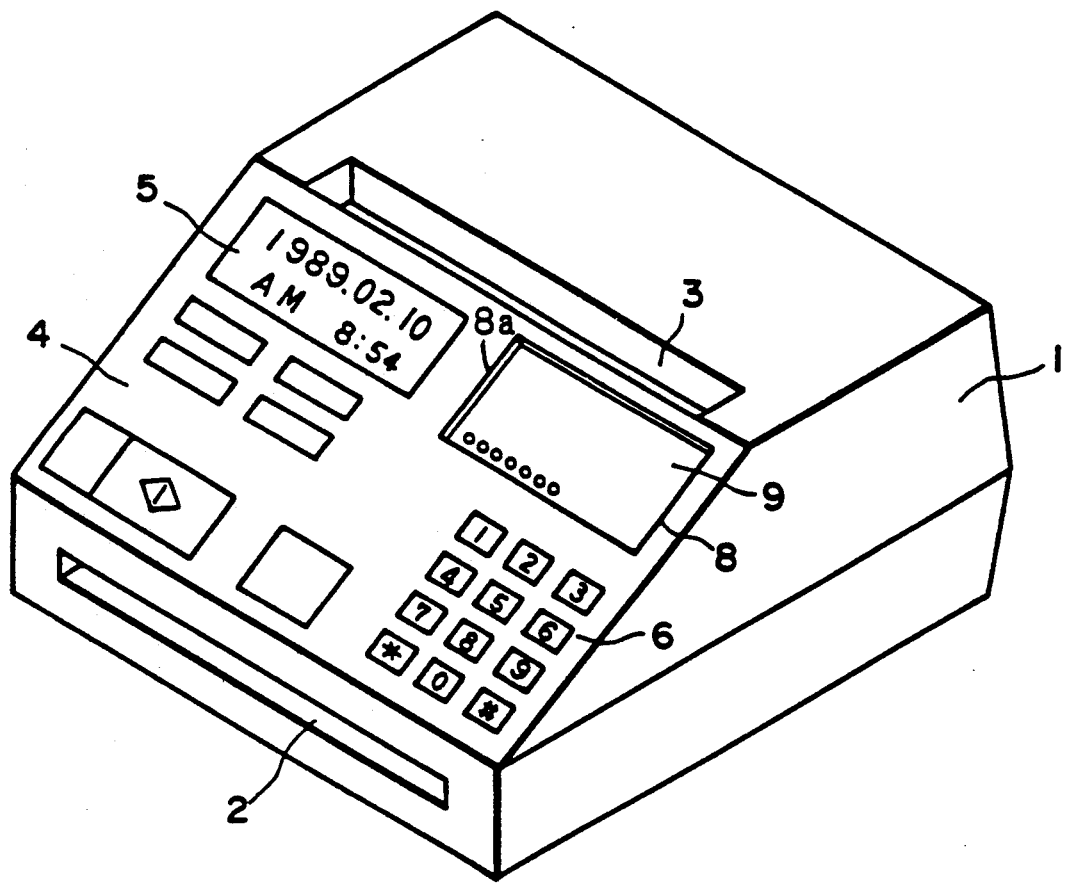
FIG. 2 shows the system in FIG. 1 with a card removed.
Figure 3:
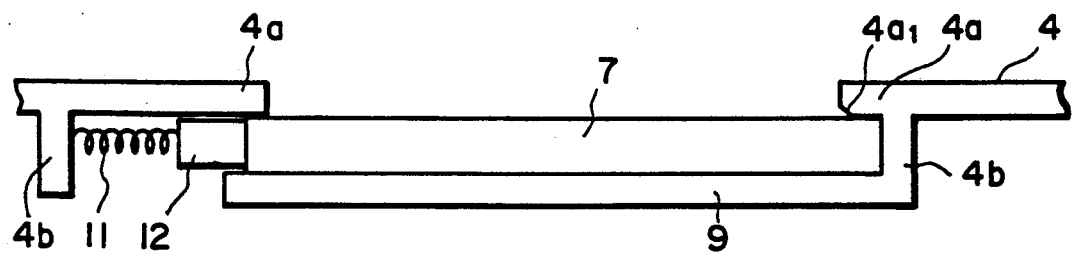
FIG. 3 is a detailed view of the mounting portion shown in FIG. 1.
Figure 4:
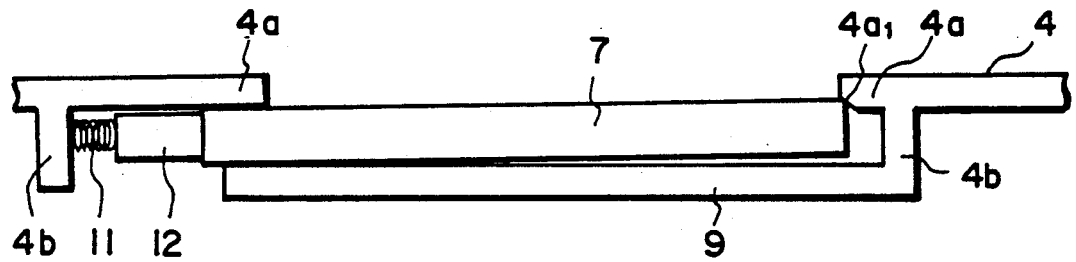
FIG. 4 is a detailed view of the mounting portion shown in FIG. 3 when a card is mounted.
Figure 5:
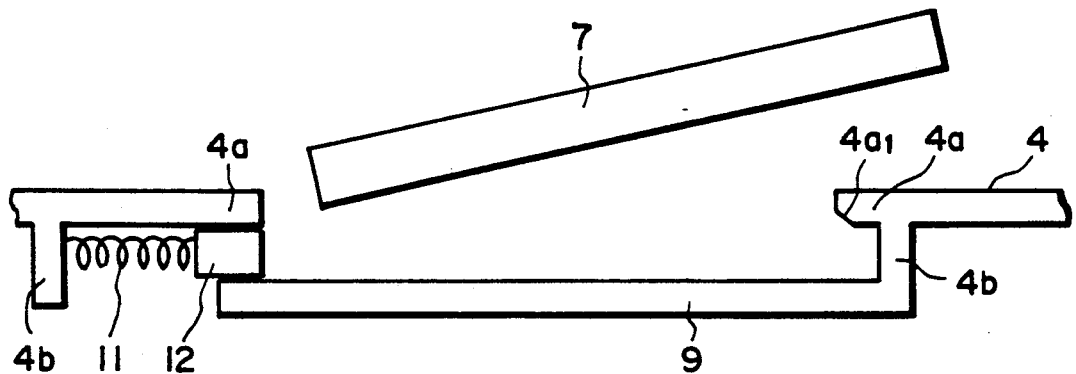
FIG. 5 is a detailed view of the mounting portion in FIG. 2 with a card removed.
Figure 6:
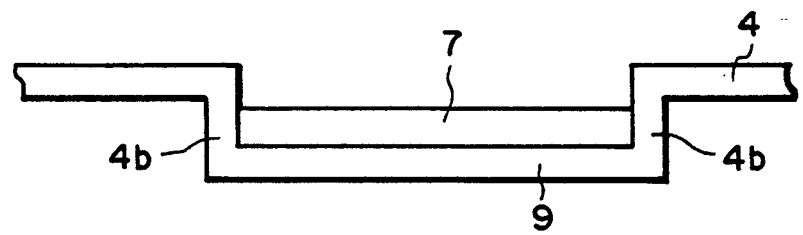
FIG. 6 is a lateral view of the mounting portion in FIG. 1 which is viewed from another side.

A first embodiment of the invention is described below in conjunction with the drawings. FIGS. 1 and 2 show the appearance of a facsimile system having an electronic telephone directory which acts as a data input/output unit. 1 represents a main unit, and 2, an original insertion slot. 3 is an outlet of originals and recording sheets and located on the top of the main unit 1. 4 is an operation panel inclining forward and downward from the top of the main unit 1. On the operation panel 4, a display 5, ten-key pad 6, and other various keys are arranged. The operation panel 4 is provided with a mounting portion 8 onto which a data memory card 7 is mounted. The mounting portion 8 forms a recess, having an opening 8a for attaching and detaching the data memory card 7 and for operating keys on the card 7 externally. The opening 8a has almost the same size as the card 7. The length of the opening 8a is slightly shorter than that of the card 7, and the width of the opening 8a, slightly longer than that of the card 7. This is intended to help insert a card 7 from the opening 8a and prevent it from coming off. In the mounting portion 8, an installation unit 9 on which the card 7 is placed is formed integrally with the operator panel 4 as shown in FIGS. 3, 4, and 5. The installation unit 9 has an array of light receiving elements $N_1$ to $N_7$. On the inner side of the mounting portion 8, a spring 11 or a pressing member is provided. The inner circumference of the mounting portion 8 forms a side wall 4b, the side wall 4b is provided with the spring 11. A sliding member 12 is attached to the tip of the spring 11. The periphery 4a on the shorter side of the opening of the mounting portion 8 is protruded, while the periphery 4a on the longer side of the opening is not protruded as shown in FIG. 6. This helps mount the card. One end of the card 7 is pushed with a force of the spring 11 as a biasing member. Thereby, another end of the card 7 is pushed against the side wall 4b. A lower end corner of the opening periphery near the side wall 4b forms a chamfered portion $4a_1$.

Figure 7:
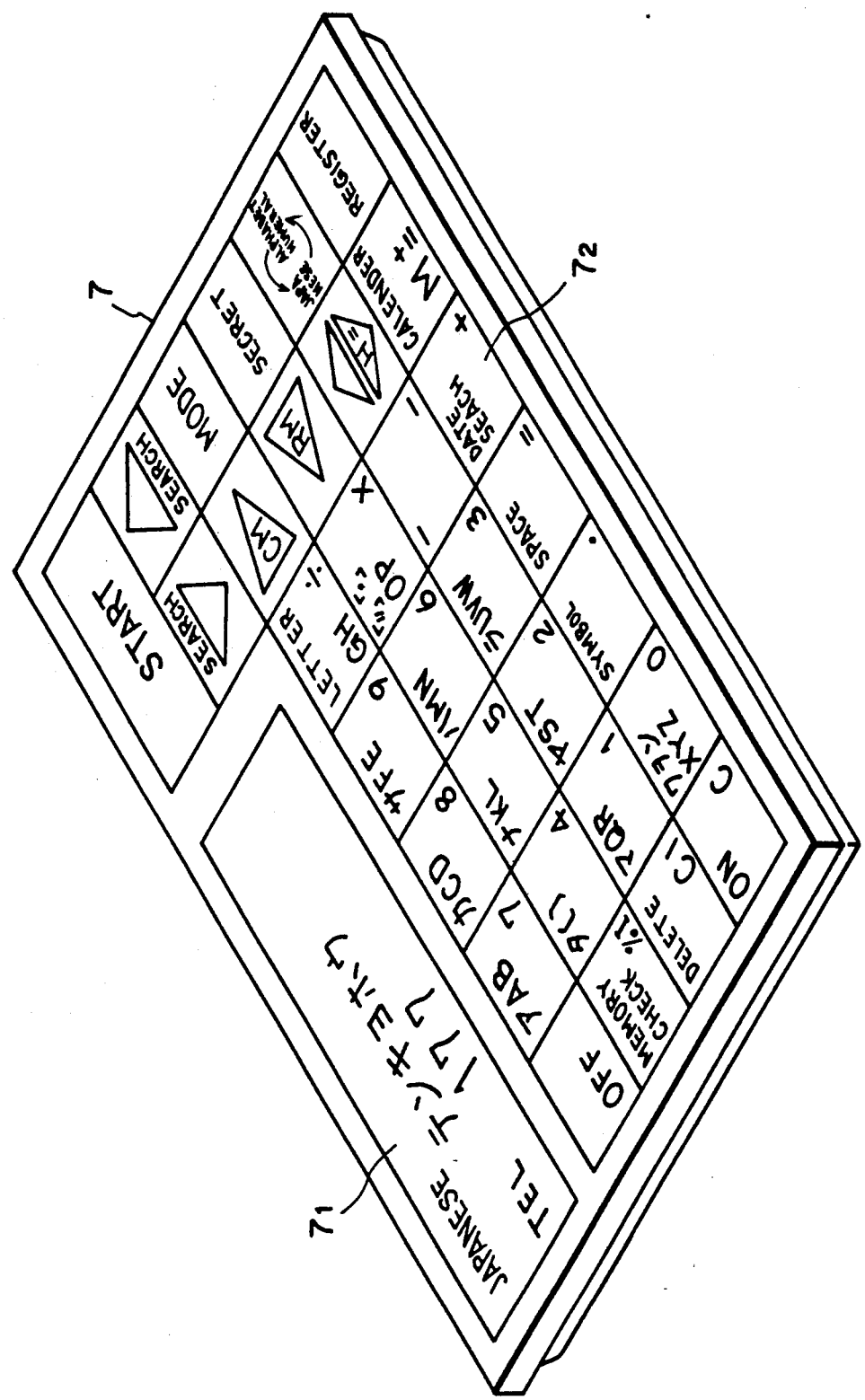
FIG. 7 is a perspective view of the data memory card used in the system shown in FIG. 1 which viewed from the front.
Figure 8:
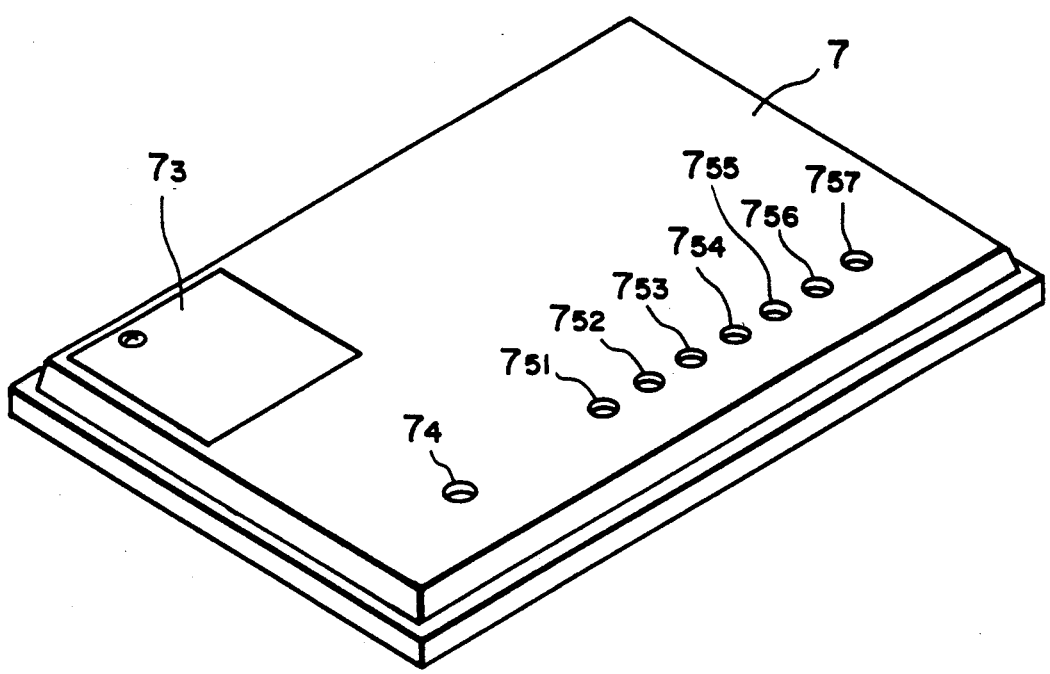
FIG. 8 is a perspective view of the data memory card shown in FIG. 6 which is viewed from the back.
Figure 9:
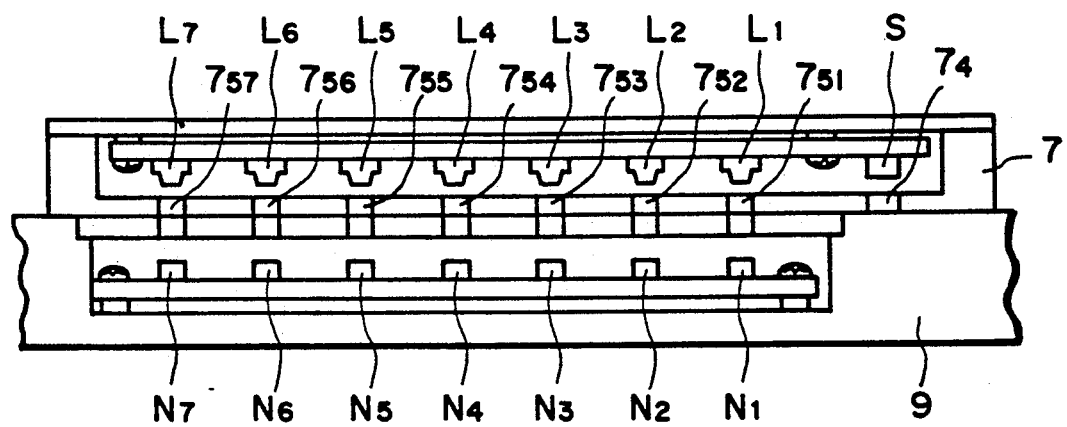
FIG. 9 shows the relation between the light receiving unit shown in FIG. 2 and the light emitting unit shown in FIG. 7.

On the surface of the data memory card 7, a display $7_1$ and various data keys $7_2$ are arranged as shown in FIG. 7. The data keys $7_2$ actuate the function of a telephone directory by identifying a data item contained in the card 7. The display $7_1$ displays the data item identified. On the back of the card 7, a battery cover $7_3$, a RESET switch window $7_4$, and LED windows $7_{51}$ to $7_{57}$ are arranged as shown in FIG. 8. The battery cover $7_3$ is fixed to the card 7 with a screw, wherein a lithium battery is accommodated. When the center of the RESET switch window $7_4$ is pressed with a pin, a RESET switch S within the card 7 is actuated to clear various data items stored in memory. The LED windows $7_{51}$ to $7_{57}$ transmit light beams of seven light emitting diodes $L_1$, $L_2$, $L_3$, $L_4$, $L_5$, $L_6$, and $L_7$ incorporated in the card. The light emitting diodes $L_1$ to $L_7$ are opposed to seven light receiving elements $N_1$, $N_2$, $N_3$, $N_4$, $N_5$, $N_6$, and $N_7$ as shown in FIG. 9. Depending on the light receiving results of these light receiving elements $N_1$ to $N_7$, a data item selected with keys on the card 7 is inputted to the main unit of the facsimile system.

Next, the operations of the facsimile system having the aforesaid configuration are described.

The card 7 is held in such a way that LED windows $7_{51}$ to $7_{57}$ on the back of the card 7 may match light receiving elements $N_1$ to $N_7$ in the facsimile system. While the card 7 is being inclined, one end of the card 7 is inserted between the periphery 4a of the opening 8a and the installation plate 9 so as to press a flat spring 11 or a pressing member. Thereby, another end of the card 7 is inserted between the periphery 4a of the opening 8a and the installation unit 9.

At this time, if the card 7 is floating above the bottom of a mounting portion 8, one end of the card 7 touches a chamfered portion $4a_1$ as shown in FIG. 4. However, since the card 7 is pressed by the spring 11, the one end of the card 7 is moved downward and then inserted between the periphery 4a of the opening 8a and the installation unit 9. Then, when the card 7 is released from the operator's fingers, the card 7 is biassed against the side wall 4b by the spring 11. This prevents the card 7 from coming off and positions the card 7 between the opening 8a and the periphery 4a.

Thus, the card 7 is positioned correctly in a direction parallel with the bottom of the mounting portion 8, and placed in the mounting portion 8 assuredly. Thereby, light emitting diodes $L_1$ to $L_7$ and light receiving elements $N_1$ to $N_7$ form no gap therebetween and positioned correctly, permitting a correct communication.

Keys $7_2$ on the card 7 are visible to the operator through the opening 8a. The operator presses intended keys $7_2$ of the card 7 with his/her finger. Thereby, information specified with the keys $7_2$ on the card 7 is transmitted as light information from light emitting diodes $L_1$ to $L_7$ to light receiving elements in the main unit of the facsimile system.

To remove the card 7 from the mounting portion 8, while the card 7 is being pressed against the spring 11, another end of the card 7 is removed from between the periphery 4a of the opening 8a and the installation plate 9. Then one end is removed from between the periphery 4a of the opening 8a and the installation plate 9. Thus, the card 7 can be extracted from the mounting portion 8.

Figure 10:
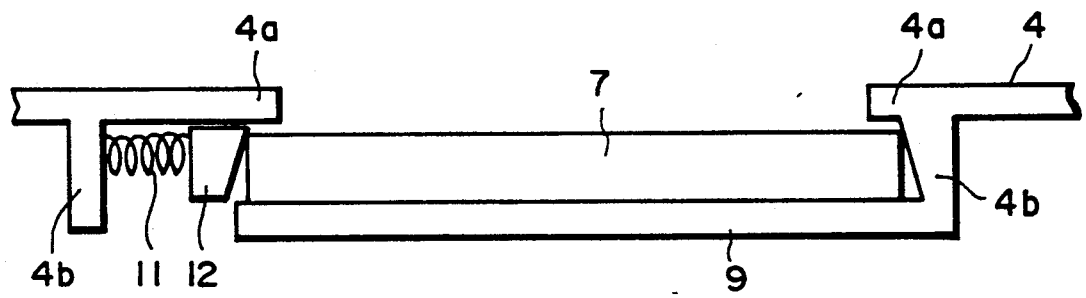
FIG. 10 is a detailed view of the mounting portion of the system implementing the second embodiment of the invention.
Figure 11:
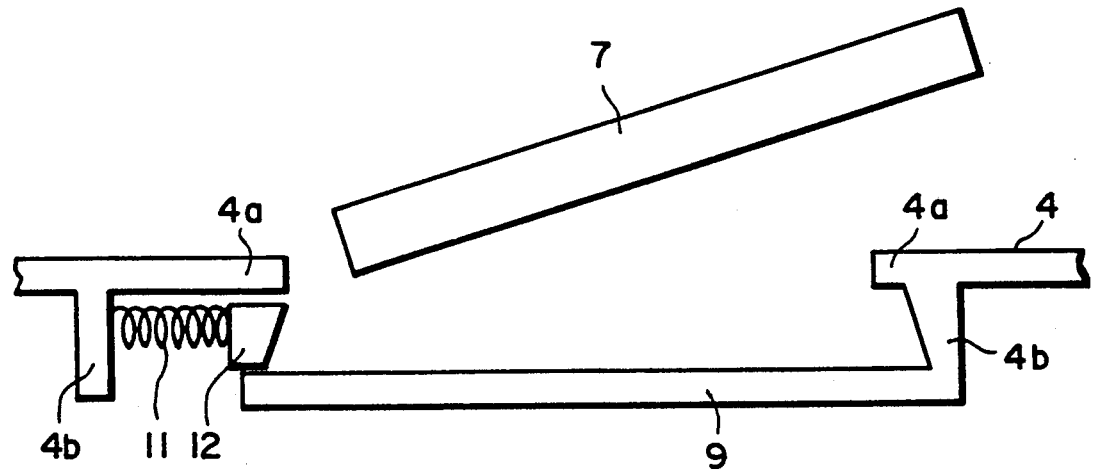
FIG. 11 shows the system in FIG. 12 with a card removed.
Figure 15:
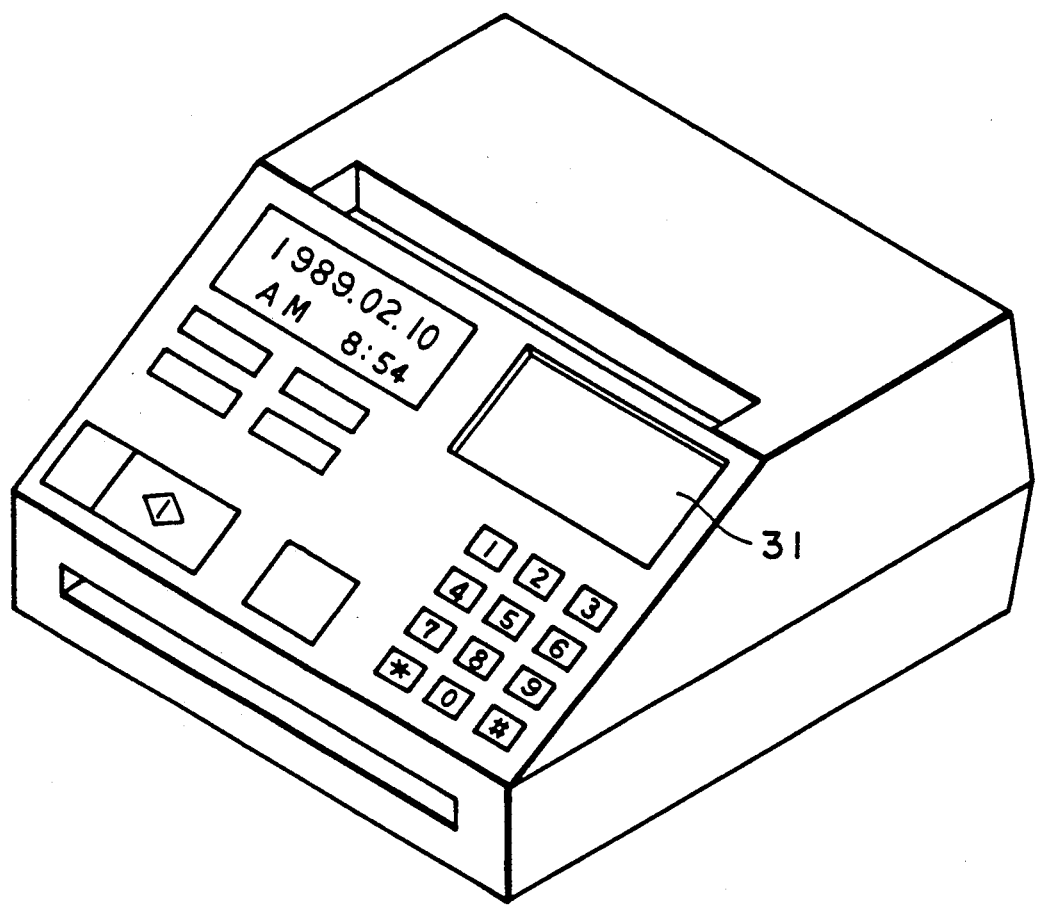
FIG. 15 shows a prior system.

A second embodiment of the invention is described below. Described are only the differences from the first embodiment. In FIGS. 10 and 11, a side of a mounting portion is tapered so that a card may be pressed downward. Therein, a spring 11 is provided on the inner side of the mounting portion 8. Specifically, the spring 11 is on the side wall 4b of the mounting portion 8. At the tip of the spring 11, a sliding member 12 is attached. A face of the sliding member 12 which contacts a card 7 is tapered. This helps push the card 7 to an installation unit 9. The periphery 4a on the shorter side of an opening of the mounting portion 8 is protruded, the periphery 4a on the longer side of the opening is not protruded as shown in FIG. 6. This helps mount the card. One end of the card 7 is pushed with a force of the spring 11 as a biassing member. Thereby, another end of the card 7 is pressed against the side wall 4b. This part of the side wall 4b is tapered. This helps push the card 7 to the installation unit 9.

Next, the operations of the facsimile system having the above configuration are described.

A card 7 is held in such a way that LED windows $7_{51}$ to $7_{57}$ on the back of the card 7 may match light receiving elements $N_1$ to $N_7$ in the system. While the card 7 is being inclined, one end of the card 7 is inserted between the periphery 4a of the opening 8a and the installation plate 9 so as to press a flat spring 11 as a biassing member. Thereby, another end of the card 7 is inserted between the periphery 4a of the opening 8a and the installation unit 9. Then, when the card 7 is released from the operator's finger, it is aligned with the side wall 4b by means of the flat spring 11, pushed to the installation plate 9, and then clamped between the installation unit 9 and the periphery 4a of the opening 8a.

More specifically, when the card 7 is pushed to the tapered side wall 4b with a force of the spring 11, the card 7 is pushed downward due to a reaction from the side wall 4b. In the same way, the card 7 is pressed downward because the card contacts the sliding member 12 on the tapered surface. Therefore, the card 7 is positioned laterally due to a force of the spring 11 and in close contact with the plate 9.

Thereby, the card 7 is positioned correctly in a direction parallel with the bottom of the mounting portion 8, and pushed to the bottom of the mounting portion 8. As a result, light emitting diodes $L_1$ to $L_7$ and light receiving elements $N_1$ to $N_7$ form no gap therebetween and positioned correctly, thus permitting a correct communication.

FIG. 12 shows a modification of the second embodiment. The differences from the second embodiment shown in FIG. 10 are described below.

Both the side face 4b of a mounting portion 8 in a pressing direction of a spring 11 as a pressing member and a face of a sliding portion 12 which contacts a card are not tapered but made perpendicular. However, the lower plane of the opening periphery near the side wall 4b in a pressing direction of the spring 11 in the mounting portion 8 is tapered.

Thereby, due to a force of the spring 11, the card is pushed into a substantial V-shaped ditch which is formed by an installation unit 9, the opening periphery 4a, and the side wall 4b. Then, the card 7 is secured in an interspace with the same size as the card thickness. Thus, no backlash is created in a horizontal and vertical directions.

Unlike FIG. 12, the sliding member 12 may be shaped in the same way as that in the first embodiment. At this time, it is recommended that the sliding member 12 be tapered downward.

With the aforesaid configuration, the spring 11 causes the card 7 to be pushed into a V-shaped ditch formed by the bottom of the mounting portion 9 and the locking unit 4a. Then, the card 7 stops in an interspace with the same size as the card thickness. At this time, the card is pushed against the bottom of a mounting portion 9. No gap is created under the bottom of the card. In addition, the card is secured vertically. Therefore, light emitting elements and light receiving elements are always interspaced uniformly or distanced minimally. The card is also secured laterally. Therefore, the light emitting elements and light receiving elements are always opposing one another.

The third embodiment of the invention is described below. Described are only the differences from the first embodiment. In FIG. 13, the bottom of a mounting portion near a side wall is tapered so that a card may be pressed upward. Therein, the inner side of the mounting portion 8 is provided with a spring 11.

The side wall 4b of the mounting portion 8 is provided with the spring 11. At the tip of the spring 11, a sliding member 12 is attached. The part of the sliding member 12 which contacts a card 7 is tapered. This helps push the card 7 to the opening periphery of the mounting portion 8. The periphery 4a on the shorter side of the opening is protruded, while the periphery 4a on the longer side of the opening is not as shown in FIG. 6. This helps mount a card. An end of the card 7 is pressed by the spring 11 as a pressing member. Thereby, another end of the card 7 is pushed to the side wall 4b. The bottom of the mounting portion 8 near the side wall 4b is tapered. This helps push the card 7 to the opening periphery of the mounting portion 8. An installation unit 9 includes an optical member 13 consisting of condenser lenses $l_1$ to $l_7$ placed on light receiving elements $N_1$ to $N_7$ as shown in FIG. 14.

Therefore, if the card 7 is pushed to the opening periphery of the mounting portion 8, the card 7 and installation unit 9 are interspaced by the focal distance of the condenser lenses $l_1$ to $l_7$ in the optical member 13.

Next, the operations of the facsimile system having the above configuration are described.

A card 7 is held in such a way that LED windows $7_{51}$ to $7_{57}$ on the back of the card 7 may match light receiving elements $N_1$ to $N_7$ in the system. While the card 7 is being inclined, one end of the card 7 is inserted between the periphery 4a of the opening 8a and the installation plate 9 so as to press a flat spring 11. Thereby, another end of the card 7 is inserted between the periphery 4a of the opening 8a and the installation unit 9. Then, when the card 7 is released from the operator's finger, it is biassed toward the side wall 4b by means of the flat spring 11, pushed to the opening periphery 9, and then clamped between the installation unit 9 and the periphery 4a of the opening 8a.

More specifically, when the card 7 is pushed toward the tapered side wall 4b by the spring 11, the card 7 is pushed upward due to a reaction from the side wall 4b. In the same way, the card 7 is pushed upward because the card touches the sliding member 12 on a tapered face thereof. Therefore, the card 7 is positioned laterally due to the spring 11, pushed upward, and then brought into a close contact with the opening periphery.

Thereby, the card 7 is positioned in a direction parallel with the bottom of the mounting portion 8, and pushed against the opening periphery of the mounting portion 8. This causes a gap between light emitting diodes $L_1$ to $L_7$ and light receiving elements $N_1$ to $N_7$. This gap corresponds to the distance the condenser lenses $l_1$ to $l_7$ in the optical member 13 need to focus the light of the light emitting diodes $L_1$ to $L_7$ on the receiving plane of the light receiving elements $N_1$ to $N_7$. Therefore, the light emitting diodes $L_1$ to $L_7$ and the light receiving elements $N_1$ to $N_7$ are positioned correctly with respect to the optical member 13, permitting a correct communication.

In the aforesaid embodiments, a sliding member is attached to the tip of a spring member. A flat spring may be used as a biassing member. The spring may be installed to directly contact a card. Then, the contacting surface or end surface may be tapered.

As described previously, according to the invention, even if a card is mounted in a mounting portion carelessly, the card can be properly positioned. Thereby, a light receiving unit and a light emitting unit can be positioned correctly. A gap is created between the light receiving and light emitting units. This eliminates a transfer failure due to insufficient light, or an incorrect data transmission due to incident external light. As a result, an accurate data transmission can be performed.

I claim:

1. A data input/output system, comprising:
   a card mounting portion for mounting a data memory card having data input keys and a first means for transmitting data freely detachably, said card mounting portion being formed with a recessed portion to receive said data memory card, and having an opening portion so that said input keys of the received data memory card can be operated, a pair of opposed peripheral portions of the opening portion, each of said peripheral portions being formed with a projection dimensioned and disposed so that the card can be inserted through the opening portion, said projections preventing the card from coming out of the opening portion, and another pair of opposed peripheral portions being formed with no projections;
   communication means for communicating data between said first means and a second means, said second means being provided in said card mounting portion;
   biasing means for biasing said card in a direction parallel to the bottom of said mounting portion when said card is mounted in said card mounting portion, the biasing means being disposed below one of the projections; and
   positioning means for positioning said card in said card mounting position so that said first means may communicate with said second means, said positioning means comprising a tapered portion formed at said face of said mounting portion below the other of the projections, the tapered portion pressing said card against a bottom face of said mounting portion and positioning the card.

2. A data input/output system according to claim 1, wherein said positioning means comprises a further tapered portion formed at a tip end in the biasing direction of said biasing means, said further tapered portion pressing said card together with said first tapered portion against the bottom face to position the card.

3. A data input/output system according to claim 1, wherein said tapered portion is also formed at a lower face of the other of the projections.

4. A data input/output system according to claim 1, wherein said first means is a transmission means and said second means is a receiving means.

5. A data input/output system, comprising:
   a card mounting portion for mounting a data memory card having data input keys and a first means for transmitting card data freely detachably, said card mounting portion being formed with a recessed portion to receive said data memory card and having an opening portion so that input keys of the received card may be operated, a pair of opposed peripheral portions of the opening portion, each of said portions being formed with a projection dimensioned and disposed so that the card can be inserted through the opening portion, said projections preventing the card from coming out of the opening portion, and another pair of opposed peripheral portions being formed with no projections;
   communication means for communicating data between said first means and a second means, said second means being provided in said card mounting portion;
   biasing means for biasing said card in a direction parallel with the bottom of said mounting portion when said card is mounted in said card mounting portion, the biasing means being provided below one of the projections; and
   positioning means for positioning said card in said card mounting portion so that said first means and said second means may be opposed to each other and communicate data, said positioning means having a tapered portion formed between a bottom face of said mounting portion and a side face of said mounting portion below the other of the projections, the tapered portion pressing said card against a lower face of the projections to generate a gap between the card and the bottom face of the mounting portion;
   transmission means being sandwiched between said first means and said second means to transmit signals between the two means, said transmission means making a correct positional relationship of said first means and a said second means with taking said gap in consideration.

6. A data input/output system according to claim 5, wherein said transmission means is an optical member which is provided in the bottom of said mounting portion.

7. A data input/output system, comprising:
   a card mounting portion for mounting a data memory card having data input keys and a first means for transmitting data freely detachably, said card mounting portion being formed with a recessed portion to receive said data memory card and having an opening portion so that input keys of the received card may be operated, a pair of opposed peripheral portions of the opening portion, each of said pair of opposed peripheral projections being formed with a projection dimensioned and disposed so that the card can be inserted therethrough, said projections preventing said card from coming out of the opening portion and another pair of the opposed peripheral portions being formed with no projections;
   transmission means for transmitting data between said first means and a second means, the second means being provided in said card mounting portion;
   biasing means for biasing said card in a direction parallel with the bottom of said mounting portion when said card is mounted in said card mounting portion, the biasing means being provided below one of the projections; and
   means for positioning said card so that said first means can communicate with said second means when said card is mounted in said card mounting portion, and which prevents said card from coming out of said card mounting portion, said positioning means having a chamfered portion formed at a lower face of the other of said projections, said chamfered portion making mounting of said card onto said mounting portion easy.

* * * * *

UNITED STATES PATENT AND TRADEMARK OFFICE
CERTIFICATE OF CORRECTION

PATENT NO. : 5,254,988
DATED : October 19, 1993
INVENTOR(S) : YUJI NAKANO

It is certified that error appears in the above-identified patent and that said Letters Patent is hereby corrected as shown below:

COLUMN 1

Line 18, "is tend" should read --tends--.

COLUMN 2

Line 8, "made" should read --brought--.
Line 15, "made" should read --brought--.
Line 22, "described" should read --described,--.
Line 29, "an even" should read --a level--.
Line 61, "which" should read --which is--.

COLUMN 4

Line 28, "biassed" should read --biased--.
Line 36, "and" should read --and, are--.
Line 68, "biassing" should read --biasing--.

COLUMN 5

Line 12, "biassing" should read --biasing--.
Line 32, "positioned" should read --are positioned--.
Line 45, "ditch" should read --slot--.
Line 49, "a" should read --the--.
Line 57, "ditch" should read --slot--.

COLUMN 6

Line 14, "not" should read --not,--.
Line 39, "biassed" should read --biased--.
Line 68, "biassing" should read --biasing--.

UNITED STATES PATENT AND TRADEMARK OFFICE
CERTIFICATE OF CORRECTION

PATENT NO. : 5,254,988
DATED : October 19, 1993
INVENTOR(S) : YUJI NAKANO

It is certified that error appears in the above-identified patent and that said Letters Patent is hereby corrected as shown below:

COLUMN 8

Line 29, "a" and "with" should be deleted.

Signed and Sealed this

Thirtieth Day of August, 1994

*Attest:*

BRUCE LEHMAN

*Attesting Officer*    Commissioner of Patents and Trademarks